(12) United States Patent
Reyes et al.

(10) Patent No.: US 9,193,899 B2
(45) Date of Patent: Nov. 24, 2015

(54) TREATMENT FLUIDS COMPRISING AN ALKALI METAL COMPLEXING AGENT AND METHODS FOR USE THEREOF

(75) Inventors: Enrique A. Reyes, Duncan, OK (US); Alyssa L. Smith, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 800 days.

(21) Appl. No.: 13/444,897

(22) Filed: Apr. 12, 2012

(65) Prior Publication Data

US 2013/0269944 A1 Oct. 17, 2013

(51) Int. Cl.
- C09K 8/528 (2006.01)
- E21B 43/16 (2006.01)
- C09K 8/74 (2006.01)

(52) U.S. Cl.
CPC . C09K 8/528 (2013.01); C09K 8/74 (2013.01); E21B 43/16 (2013.01)

(58) Field of Classification Search
None
See application file for complete search history.

(56) References Cited

U.S. PATENT DOCUMENTS

| | | | |
|---|---|---|---|
| 4,698,168 A | 10/1987 | Briggs | |
| 4,888,121 A * | 12/1989 | Dill et al. | 507/241 |
| 5,685,918 A | 11/1997 | Tate | |
| 5,744,151 A | 4/1998 | Capelli | |
| 5,762,821 A | 6/1998 | Tate | |
| 7,781,381 B2 | 8/2010 | Ke et al. | |
| 2005/0197257 A1 | 9/2005 | Bouwmeester | |
| 2009/0075844 A1 | 3/2009 | Ke et al. | |
| 2010/0089579 A1 | 4/2010 | Reyes et al. | |
| 2011/0259592 A1 | 10/2011 | Reyes | |
| 2012/0067576 A1 | 3/2012 | Reyes et al. | |
| 2012/0097392 A1 | 4/2012 | Reyes et al. | |
| 2012/0115759 A1 | 5/2012 | Reyes | |

FOREIGN PATENT DOCUMENTS

| | | |
|---|---|---|
| WO | WO 2012/080296 A1 | 6/2012 |
| WO | WO 2012/080297 A1 | 6/2012 |
| WO | WO 2012/080298 A1 | 6/2012 |
| WO | WO 2012/080299 A1 | 6/2012 |
| WO | WO 2012/080463 A1 | 6/2012 |
| WO | 2013154711 A1 | 10/2013 |

OTHER PUBLICATIONS

Gelmboldt et al., "Two New 'Onium' Fluorosilicates, the Products of Interaction of Fluorosilicic Acid with 12-Membered Macrocycles: Structures and Spectroscopic Properties," Dalton Trans., 2007, 2915-2924.
Kumar et al., "Precipitation of Sodium Silicofluoride (Na2SiF6) and Cryolite (Na3AlF6) from HF/HCI Leach Liquors of Alumino-Silicates," Hydrometallurgy 104 (2010), 304-307.
Frayret et al., "Solubility of (NH4)2SiF6, K2SiF6 and Na2SiF6 in Acidic Solutions," Chemical Physics Letters 427 (2006) 356-364.
Busey et al., "Fluorosilicate Equilibria in Sodium Chloride Solutions from 0 to 60° C.+," Inorg. Chem. 1980, 19, 758-761.
Urbansky et al., "Can Fluoridation Affect Lead(II) in Potable Water? Hexafluorosilicate and Fluoride Equilibria in Aqueous Solution," Intern. J. Environ. Studies, 2000, vol. 57, pp. 597-637.
Urbansky, Edward Todd, "Fate of Fluorosilicate Drinking Water Additives," Chem. Rev. 2002, 102, 2837-2854.
Poonia, Narinder Singh, "Coordination Chemistry of Sodium and Potassium Complexation with Macrocyclic Polyethers," J. Am. Chem. Soc., 1974, 96 (4), 1012-1019.
Helgeson et al., "Host-Guest Complexation. 50. Potassium and Sodium Ion-Selective Chromogenic Ionophores," J. Am. Chem. Soc., 1989, 111 (16), 6339-6350.
Strasser et al., "Influence of Solvent Properties on the Kinetics of Complexation of the Sodium Ion with 18-Crown-6," J. Am. Chem. Soc., 1985, 107 (26), 7921-7924.
Gdanski, R.D., "Fluosilicate Solubilities Affect HF Acid Compositions," SPE 27404, 1994.
Acker et al., "Chemical Analysis of Acidic Silicon Etch Solutions II. Determination of HNO3, HF, and H2SiF6 by Icon Chromatography," Science Direct, Talanta 72, 2007, 1540-1545.
Day et al., "Anionic Five-Coordinated Cyclic Organofluorosilicates Varying in Ring Size from Five- to Seven-Membered," Organometallics 1991, 10, 1758-1766.
Stover et al., "Sodium Cation Complexation by Large Crown Ethers: 23 Na NMR Chemical Shifts and Longitudinal and Transverse Relation Rate Studies of Sodium Tetraphenylborate-Dibenzo-24-crown-8 Complexes in Nitromethane," J. Am Chem. Soc., 1985, 107 (14), 4167-4171.
Hase et al., "Reaction Path and Kinetics for Na+ Complexation with 18-Crown-6," J. Phys. Chem., 1989, 93 (2), 539-545.
Elliott et al., "Polymerization Kinetics of Pseudocrown Ether Network Formation for Facilitated Transport Membranes," Macromolecules, 1999, 32 (10), 3201-3208.
Elliott et al., "Pseudo-Crown Ethers as Fixed Site Carriers in Facilitated Transport Membranes," Journal of Membrane Science 168 (2000) 109-119.
Zhang et al., "Use of the Anti-Scale Disperser to Reduce Scaling of Potassium/Sodium Fluorosilicate in the Filtration System for Phosphoric Acid," The Chemical Engineering Institute of Sichuan University, 2001.
Kalfayan, Leonard, "Production Enhancement with Acid Stimulation," PennWell Corporation, 2000.
Kalfayan, Leonard, "Production Enhancement with Acid Stimulation," 2nd ed., PennWell Corporation, 2008.
Pedersen, CJ, "Cyclic Polyethers and Their Complexes with Metal Salts," Journal of the American Chemical Society, ACS Publications, US, vol. 89, Jan. 1, 1967, pp. 7017-7036, XP009079172.
International Search Report and Written Opinion for PCT/US2013/030198 dated May 27, 2013.

* cited by examiner

*Primary Examiner* — Angela M DiTrani
(74) *Attorney, Agent, or Firm* — McDermott Will & Emery LLP; Holly Soehnge

(57) ABSTRACT

Alkali metal ions may lead to the production of insoluble materials during the course of stimulating a subterranean formation, particularly when acidizing a siliceous formation or a formation containing a siliceous material. Alkali metal ions may be sequestered using an alkali metal complexing agent in order to reduce their propensity toward forming insoluble materials in a subterranean formation. Methods for stimulating a subterranean formation can comprise: providing a treatment fluid that comprises an alkali metal complexing agent comprising a cyclic polyether having between 3 and 6 ether oxygen atoms present therein, and hydrofluoric acid, a hydrofluoric acid-generating compound, or any combination thereof; and introducing the treatment fluid into a subterranean formation.

21 Claims, No Drawings

TREATMENT FLUIDS COMPRISING AN ALKALI METAL COMPLEXING AGENT AND METHODS FOR USE THEREOF

BACKGROUND

The present disclosure relates to stimulation of subterranean formations, and, more specifically, to treatment fluids that can lessen the opportunity for alkali metal ions to produce insoluble materials during the course of performing a stimulation operation.

Treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof. Illustrative treatment operations can include, for example, fracturing operations, gravel packing operations, acidizing operations, scale dissolution and removal, consolidation operations, and the like.

In acidizing operations, a subterranean formation containing an acid-soluble material can be treated with an acid to dissolve at least a portion of the material. Formation components of the formation matrix may comprise the acid-soluble material in some cases. In other cases, the acid-soluble material may have been deliberately introduced into the subterranean formation in conjunction with a stimulation operation (e.g., proppant particulates). Illustrative examples of formation components that may be dissolved by an acid include, for example, carbonates, silicates, and aluminosilicates. Dissolution of these formation components can desirably open voids and conductive flow pathways in the formation that can improve the formation's rate of hydrocarbon production, for example. In a similar motif, acidization may be used to remove like types of precipitation damage that can be present in the formation.

Carbonate formations often contain minerals that comprise a carbonate anion (e.g., calcite). When acidizing a carbonate formation, the acidity of the treatment fluid alone can be sufficient to solubilize the formation components. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars. Most sandstone formations, for example, contain about 40% to about 98% sand quartz particles (i.e., silica), bonded together by various amounts of cementing material including carbonates (e.g., calcite), aluminosilicates, and other silicates. As used herein, the term "siliceous" refers to a substance having the characteristics of silica, including silicates and/or aluminosilicates.

Acidizing a siliceous formation (e.g., a sandstone formation or a clay-containing formation) or a formation containing a siliceous material is thought to be considerably different than acidizing a carbonate formation. Specifically, the treatment of a siliceous formation with the treatment fluids commonly used for acidizing a carbonate formation may have little to no effect, because mineral acids and organic acids do not effectively react with siliceous materials. In contrast to mineral acids and organic acids, hydrofluoric acid can react very readily with siliceous materials to produce soluble substances. Oftentimes, a mineral acid or an organic acid can be used in conjunction with a hydrofluoric acid-containing treatment fluid to maintain the treatment fluid in a low pH state as the hydrofluoric acid becomes spent. In some instances, the low pH of the treatment fluid may promote initial silicon dissolution and aid in maintaining the silicon in a dissolved state. At higher subterranean formation temperatures (e.g., above about 200° F.), it may be undesirable to lower the pH much below about 1 due to mineral instability that can occur. Additionally, regardless of the formation temperature, corrosion can be an inevitable problem that occurs when very low pH treatment fluids are used.

Although low pH treatment fluids may be desirable to aid in silicon dissolution, precipitation of insoluble fluorosilicates and aluminosilicates can still become problematic in the presence of certain metal ions. Specifically, under low pH conditions (e.g., below a pH of about 3), dissolved silicon can react with Group 1 metal ions (e.g., $Na^+$ and $K^+$) to produce insoluble fluorosilicates and aluminosilicates. The terms "Group 1 metal ions" and "alkali metal ions" will be used synonymously herein. Other metal ions, including Group 2 metal ions (e.g., $Ca^{2+}$ and $Mg^{2+}$), may also be problematic in this regard. The precipitation of insoluble fluorosilicates and aluminosilicates can block pore throats and undo the desirable permeability increase initially achieved by the acidizing operation. That is, the formation of insoluble fluorosilicates and aluminosilicates can damage the subterranean formation. In many instances, the damage produced by insoluble fluorosilicates and aluminosilicates can be more problematic than if the acidizing operation had not been conducted in the first place. In contrast to many metal ions, ammonium ions ($NH_4^+$) are not believed to promote the formation of insoluble fluorosilicates and aluminosilicates. Accordingly, treatment fluids comprising an ammonium salt are frequently used in conjunction with acidizing a siliceous formation, as discussed further below.

Problematic alkali metal ions or other metal ions can come from any source including, for example, the treatment fluid, a component of the treatment fluid, or the subterranean formation itself. For example, the carrier fluid of a treatment fluid may contain some sodium or potassium ions unless costly measures (e.g., deionization) are taken to limit their presence. Alkali metal ions, in particular, are widely distributed in the environment and can be especially difficult to avoid completely when conducting a subterranean treatment operation. As discussed further below, a variety of strategies have been developed to address the most common sources of problematic metal ions encountered when conducting subterranean treatment operations.

One strategy that has been used with some success to avoid the damaging effects of metal ions includes introducing a sequence of pre-flush treatment fluids into the subterranean formation prior to performing an acidizing operation with a hydrofluoric acid-containing treatment fluid. For example, a pre-flush treatment fluid comprising a mineral acid or an organic acid can be used to dissolve acid-soluble formation components and remove at least a portion of the problematic metal ions from the formation. Thereafter, another pre-flush treatment fluid comprising an ammonium salt can be introduced into the subterranean formation to displace the remaining formation metal ions and leave the formation enriched in ammonium ions. Although this approach can be used successfully, it can considerably add to the time and expense needed to perform an acidizing operation.

Another strategy that can be used to mitigate the effects of metal ions in acidizing operations is to introduce a chelating agent into the subterranean formation. Although this strategy can be successful for Group 2 metal ions and transition metal ions, for example, chelation is believed to be somewhat less effective for alkali metal ions. In addition, many chelating agents are utilized in their salt form, which is many times their $Na^+$ or $K^+$ salt form. Thus, use of a chelating agent, although reducing precipitation effects from certain metal ions, can actually exacerbate the precipitation effects of alkali metal ions. Sometimes the free acid or ammonium salt forms of chelating agents can be used to avoid this issue, at least in principle, but the free acid and/or ammonium salt forms of many chelating agents are either unknown or not commercially available at a reasonable cost. Furthermore, many common chelating agents are not biodegradable or present other toxicity concerns that can make their use in a subterranean formation problematic.

Crown ethers are one class of compounds that has been shown to have good properties for sequestering (complexing) alkali metal ions. Conventional crown ethers comprise a cyclic polyether macrocycle, where the macrocyclic ring size can dictate its selectivity for complexing different alkali metal ions. Although crown ethers have been used extensively in chemical synthesis, cost and toxicity issues associated with these compounds have tempered their use elsewhere. Azacrown ethers, which have one ether oxygen atom replaced with nitrogen, can show enhanced selectivities and binding affinities compared to crown ethers, but they are more expensive still. Most likely due to cost factors, it is not believed that either of these types of compounds have heretofore been contemplated for use in subterranean treatment operations, particularly to mitigate the precipitation of fluorosilicates and aluminosilicates that may occur in conjunction with an acidizing operation.

SUMMARY OF THE INVENTION

The present disclosure relates to stimulation of subterranean formations, and, more specifically, to treatment fluids that can lessen the opportunity for alkali metal ions to produce insoluble materials during the course of performing a stimulation operation.

In some embodiments, the present invention provides a method comprising: providing a treatment fluid that comprises: an alkali metal complexing agent comprising a cyclic polyether having between 3 and 6 ether oxygen atoms present therein; and hydrofluoric acid, a hydrofluoric acid-generating compound, or any combination thereof; and introducing the treatment fluid into a subterranean formation.

In some embodiments, the present invention provides a method comprising: providing a treatment fluid that comprises: an alkali metal complexing agent comprising a pseudocrown ether; forming a complex of the pseudocrown ether with an alkali metal ion; and introducing the treatment fluid into a subterranean formation.

In some embodiments, the present invention provides a method comprising: providing a treatment fluid having a pH ranging between about 0 and about 8 that comprises: an alkali metal complexing agent comprising a pseudocrown ether; introducing the treatment fluid into a subterranean formation; and performing an acidizing operation in the subterranean formation.

In some embodiments, the present invention provides a treatment fluid comprising: an alkali metal complexing agent comprising a pseudocrown ether; hydrofluoric acid, a hydrofluoric acid-generating compound, or any combination thereof; and optionally, a chelating agent, an alkali metal salt of a chelating agent, a non-alkali metal salt of a chelating agent, or any combination thereof.

The features and advantages of the present invention will be readily apparent to one having ordinary skill in the art upon a reading of the description of the preferred embodiments that follows.

DETAILED DESCRIPTION

The present disclosure relates to stimulation of subterranean formations, and, more specifically, to treatment fluids that can lessen the opportunity for alkali metal ions to produce insoluble materials during the course of performing a stimulation operation.

As described above, metal ions, especially alkali metal ions, can lead to a number of issues when present during an acidizing operation. Particularly in the presence of dissolved silicon (e.g., in the form of $SiF_4$, $SiF_5^-$, or $SiF_6^{2-}$), alkali metal ions can result in damaging alkali fluorosilicate precipitates. Current approaches to dealing with the issue of fluorosilicate and aluminosilicate precipitation can be costly and may be insufficient in some cases.

The present disclosure describes alkali metal complexing agents that can be included in treatment fluids to be used in conjunction with an acidizing operation or other stimulation operation. As used herein, the term "alkali metal complexing agent" refers to a compound that forms a reaction product with an alkali metal. The alkali metal complexing agents can sequester problematic alkali metal ions, such that they are less available to react with dissolved silicon to form insoluble materials. Treatment fluids comprising an alkali metal complexing agent, as described herein, can further comprise hydrofluoric acid, a hydrofluoric acid-generating compound, or any combination thereof, or the treatment fluid can be introduced into a subterranean formation ahead of or subsequent to a treatment fluid comprising hydrofluoric acid, a hydrofluoric acid-generating compound, or any combination thereof. Thus, treatment fluids comprising an alkali metal complexing agent may be used in response to alkali metals that are present at various stages of the treatment process.

Without being bound by any theory or mechanism, it is believed that alkali metal complexing agents can react with alkali metal ions to produce a complex that is less reactive than the free alkali metal ion. Accordingly, the alkali metal ions may be less capable of reacting with dissolved silicon to produce insoluble materials. More specifically, during an acidizing operation conducted in a siliceous formation or a formation containing a siliceous material, alkali metal complexing agents may limit the ability of alkali metal ions to react and form insoluble alkali metal fluorosilicates and aluminosilicates, which can damage the formation.

Applicant does not believe that there has been any contemplation in the art to use alkali metal complexation as a means for controlling precipitation within a subterranean formation. Crown ethers and azacrown ethers are well known alkali metal complexing agents that have been used in other applications, such as chemical synthesis. However, as described above, their use in subterranean treatment operations may have been tempered by factors including cost and toxicity, for example.

Other types of alkali metal complexing agents that are related to crown ethers and azacrown ethers may address the potential disadvantages associated with the latter two classes of compounds. Pseudocrown ethers, for example, may be a particularly suitable alternative to crown ethers and azacrown ethers. The term "pseudocrown ether," as used herein, refers to a crown ether analogue that has an ether oxygen moiety of the parent crown ether structure replaced with a carbon-containing moiety. For example, in some embodiments, the carbon-containing moiety may be a methylene group. Other functionalization and derivatization of the parent crown ether structure may also be present in pseudocrown ether analogues. Pseudocrown ethers suitable for use in the embodiments described herein are described in further detail below.

In the context of treating a subterranean formation, pseudocrown ethers may allow particular advantages to be realized over crown ethers or azacrown ethers. First, pseudocrown ethers encompass a wide structural class that may be synthesized by a number of known macrocyclization techniques. Some pseudocrown ether structures may be more easily synthesized than are the parent crown ethers, which may allow certain pseudocrown ethers to be produced at a lower cost than other types of alkali metal complexing agents. In addition, pseudocrown ethers reportedly have a reduced toxicity profile relative to crown ethers. The reduced toxicity profile may make pseudocrown ethers more environmentally acceptable for conducting subterranean treatment operations.

A number of advantages can be realized when using a treatment fluid that comprises an alkali metal complexing agent. Although such treatment fluids described herein may be particularly advantageous when used in conjunction with an acidizing operation, they may be used at any stage during the treatment of a subterranean formation. For example, treatment fluids comprising an alkali metal complexing agent may be used in conjunction with a stimulation operation (e.g., a fracturing operation), with a further stimulation operation being conducted at a later time (e.g., an acidizing operation using a treatment fluid comprising hydrofluoric acid and/or a hydrofluoric acid-generating compound). Such a treatment sequence may leave the subterranean formation desirably depleted in free alkali metal ions, such that they are less available to induce fluorosilicate and aluminosilicate precipitation once acidizing begins. In some embodiments of the present invention, a treatment fluid comprising an alkali metal complexing agent may be introduced into a subterranean formation before or subsequent to a treatment fluid comprising hydrofluoric acid, a hydrofluoric acid-generating compound, or any combination thereof. In more preferred embodiments of the present invention, particularly for acidizing operations, the separate treatment fluids may be combined into a single-stage treatment fluid that comprises both an alkali metal complexing agent and hydrofluoric acid, a hydrofluoric acid-generating compound, or any combination thereof.

A primary advantage of using a treatment fluid comprising an alkali metal complexing agent, as described herein, in conjunction with the treatment of a subterranean formation is that significantly fewer precautions may need to be taken to exclude alkali metal ions from the subterranean environment. For example, it may not be necessary to conduct a pre-flush treatment with an $NH_4^+$-containing treatment fluid prior to acidizing, or fewer pre-flush treatments may be needed. This can reduce the time and expense needed to conduct the acidizing operation. Likewise, there may be more tolerance for alkali metal ions in the carrier fluid used to formulate the treatment fluid described herein, thereby allowing saltier water sources to be used.

Use of a treatment fluid that comprises an alkali metal complexing agent, as described herein, may also significantly expand the breadth of chelating agents that may be used in conjunction with treating a subterranean formation to sequester metal ions. Specifically, use of an alkali metal complexing agent may advantageously allow sodium or potassium salts of a chelating agent to be used in lieu of the free acid or ammonium salt forms, which may be unknown, not commercially available, or expensive. In this regard, some of the more common chelating agents known in the art are available in their ammonium salt forms, but the chelating agents are not biodegradable. In contrast, only a limited number of biodegradable chelating agents are available in their free acid or ammonium salt forms. Thus, use of an alkali metal complexing agent in the present treatment fluids may allow a wider breadth of biodegradable chelating agents to be used in conjunction with an acidizing operation, which can improve the environmental profile of the acidizing operation and lower the costs associated with the chelating agent. Further discussion of biodegradable chelating agents follows hereinbelow.

In some embodiments of the present invention, a crown ether, an azacrown ether, and/or a pseudocrown ether may be used as an alkali metal complexing agent in conjunction with the treatment of a subterranean formation. In such embodiments of the present invention, the alkali metal complexing agent may comprise a cyclic polyether having between 3 and 6 ether oxygen atoms present therein. Control of the macrocyclic ring size and/or the number of ether oxygen atoms may allow selectivity to be realized in the alkali metal that is complexed. Combinations of cyclic polyethers having different ring sizes and/or numbers of ether oxygen atoms may be used in the embodiments described herein in order to expand the breadth of alkali metals complexed. Although any of a crown ether, an azacrown ether, a pseudocrown ether, or any combination thereof may be used in conjunction with treating a subterranean formation, pseudocrown ethers may be the preferred alkali metal complexing agent for some embodiments described herein. Reasons for choosing a pseudocrown ether and the advantages thereof can include those noted above.

In some embodiments of the present invention, treatment fluids described herein may comprise an alkali metal complexing agent comprising a cyclic polyether having between 3 and 6 ether oxygen atoms present therein. In some embodiments of the present invention, the treatment fluids may further comprise hydrofluoric acid, a hydrofluoric acid-generating compound, or any combination thereof. In some embodiments of the present invention, the treatment fluids may further comprise a chelating agent, an alkali metal salt of a chelating agent, a non-alkali metal salt of a chelating agent, or any combination thereof.

In some embodiments of the present invention, treatment fluids described herein may comprise an alkali metal complexing agent comprising a cyclic polyether having between 3 and 6 ether oxygen atoms present therein; and hydrofluoric acid, a hydrofluoric acid-generating compound, or any combination thereof. In some embodiments of the present invention, the treatment fluids may further comprise a chelating agent, an alkali metal salt of a chelating agent, a non-alkali metal salt of a chelating agent, or any combination thereof.

In some embodiments of the present invention, treatment fluids described herein may comprise an alkali metal complexing agent comprising a pseudocrown ether. In some embodiments of the present invention, the treatment fluids may have a pH ranging between about 0 and about 8. In some embodiments of the present invention, the treatment fluids may further comprise hydrofluoric acid, a hydrofluoric acid-generating compound, or any combination thereof. In some embodiments of the present invention, the treatment fluids may further comprise a chelating agent, an alkali metal salt of a chelating agent, a non-alkali metal salt of a chelating agent, or any combination thereof.

In some embodiments of the present invention, treatment fluids described herein may comprise an alkali metal complexing agent comprising a pseudocrown ether; and hydrofluoric acid, a hydrofluoric acid-generating compound, or any combination thereof. In some embodiments of the present invention, the treatment fluids may have a pH ranging between about 0 and about 8. In some embodiments of the present invention, the treatment fluids may further comprise a chelating agent, an alkali metal salt of a chelating agent, a non-alkali metal salt of a chelating agent, or any combination thereof.

In some embodiments of the present invention, treatment fluids described herein may comprise an alkali metal complexing agent comprising a pseudocrown ether; hydrofluoric acid, a hydrofluoric acid-generating compound, or any combination thereof; and, optionally, a chelating agent, an alkali metal salt of a chelating agent, a non-alkali metal salt of a chelating agent, or any combination thereof. In some embodiments of the present invention, the pseudocrown ether may be covalently bonded to a polymer.

In some embodiments of the present invention, the treatment fluids described herein may comprise an aqueous carrier fluid as their continuous phase. Suitable aqueous carrier fluids may include, for example, fresh water, acidified water, salt water, seawater, brine (e.g., a saturated salt solution), or an aqueous salt solution (e.g., a non-saturated salt solution). Aqueous carrier fluids can be obtained from any suitable source. In some embodiments of the present invention, the treatment fluids described herein may comprise an aqueous carrier fluid that is free of alkali metal ions or contains as low a concentration of alkali metal ions as attainable at a reasonable cost. Choice of a low salt or salt-free aqueous carrier fluid may allow a lower concentration of the alkali metal complexing agent to be used in the treatment fluids, allow saltier subterranean formations to be treated, and/or permit greater quantities of alkali metal salts of chelating agents to be used. One of ordinary skill in the art will be able to determine an acceptable working level of alkali metal ions that may be present in the treatment fluid described herein, given the benefit of this disclosure. In general, use of an alkali metal complexing agent in a treatment fluid may allow greater levity to be realized in choosing an aqueous carrier fluid for an acidizing fluid or other stimulation fluid than would otherwise be possible. In some embodiments of the present invention, the treatment fluids may comprise a carrier fluid that comprises alkali metal ions. In other embodiments of the present invention, the treatment fluids may comprise a carrier fluid that is substantially free of alkali metal ions.

In some or other embodiments of the present invention, the treatment fluids may comprise an organic solvent, such as hydrocarbons, as at least a portion of its continuous phase.

The volume of the carrier fluid to be used in the present treatment fluids may be dictated by certain characteristics of the subterranean formation being treated such as, for example, the quantity of siliceous material needing removal, the chemistry of the siliceous material, and the formation porosity. Determination of an appropriate volume of carrier fluid to be used in the treatment fluids may also be influenced by other factors, as will be understood by one having ordinary skill in the art.

In embodiments of the present invention in which a carrier fluid that comprises alkali metal ions is chosen, it is anticipated that at least an equimolar amount of the alkali metal complexing agent may be included in the treatment fluids to sequester those alkali metal ions before they are introduced into a subterranean formation. In some embodiments of the present invention, more than an equimolar amount of the alkali metal complexing agent may be used in the treatment fluids described herein. More than an equimolar amount of the alkali metal complexing agent may be used in the treatment fluids, for example, if it is desired to sequester the alkali metals in the treatment fluids and additional alkali metals in the subterranean formation. In some embodiments, less than an equimolar amount of the alkali metal complexing agent may be used in the treatment fluids described herein. Less than an equimolar amount of the alkali metal complexing agent may be used in the treatment fluids, for example, if it is desired to reduce the level of free alkali metals in the treatment fluids and/or subterranean formation but not completely eliminate them. In some embodiments of the present invention, the treatment fluids may comprise at least about 5% of the alkali metal complexing agent by weight. In other embodiments of the present invention, the treatment fluids may comprise at least about 10% of the alkali metal complexing agent by weight.

In various embodiments of the present invention, the treatment fluids described herein may have a pH of about 8 or below. We believe that such pH values, and especially pH values of about 3 or below, may be effective for dissolving silicates and/or aluminosilicates in a siliceous formation and/or maintaining dissolved silicon in the treatment fluids described herein. In addition, in embodiments of the present invention in which a chelating agent is present, some chelating agents may be more effective in forming a metal complex that can sequester a metal ion at certain pH values as opposed to others. In some embodiments of the present invention, the treatment fluids described herein may have a pH ranging between about 0 and about 8. In other embodiments of the present invention, the treatment fluids described herein may have a pH ranging between about 0 and about 6, or between about 0 and about 4, or between about 0 and about 2, or between about 1 and about 6, or between about 1 and about 4, or between about 2 and about 5, or between about 0 and about 3, or between about 3 and about 6. One of ordinary skill in the art will be able to determine an effective working pH for the treatment fluids to satisfactorily maintain silicon in a dissolved state through routine experimentation, given the benefit of this disclosure.

In some embodiments of the present invention, the alkali metal complexing agent may comprise a pseudocrown ether. In some embodiments of the present invention, suitable pseudocrown ethers may have a structure of

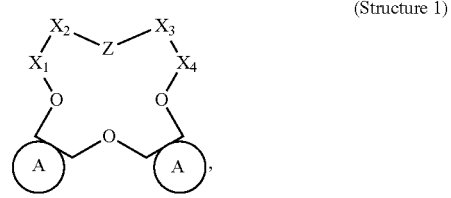
(Structure 1)

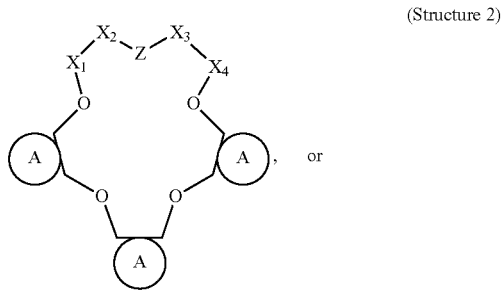
(Structure 2)

or

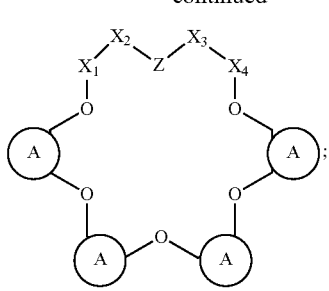
(Structure 3)

wherein, at each occurrence, A independently comprises a carbocyclic ring or —CH$_2$CH$_2$—; wherein X$_1$ and X$_4$ are independently CH$_2$ or C=O; wherein X$_2$ and X$_3$ are independently CH$_2$, CHR$_1$, or CR$_1$R$_2$; wherein R$_1$ and R$_2$ are independently selected from the group consisting of alkyl, aryl, cycloalkyl, or a polymer; and wherein Z is (CH$_2$)$_n$; wherein n is an integer ranging from 0 to 2; wherein X$_2$ and X$_3$ are bonded to one another if n is 0. As used herein, the term "carbocyclic ring" refers to any closed-chain carbon structure. In some embodiments of the present invention, a carbocyclic ring may comprise a cycloalkyl ring. In other embodiments of the present invention, a carbocyclic ring may comprise a phenyl ring or other type of aromatic ring.

In some embodiments of the present invention, each A may comprise —CH$_2$CH$_2$—. That is, in such embodiments of the present invention, suitable pseudocrown ethers may have a structure of

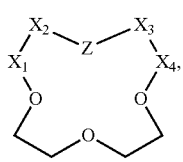
(Structure 4)

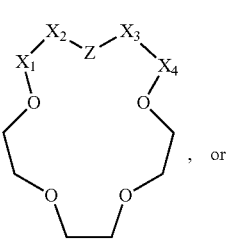
, or
(Structure 5)

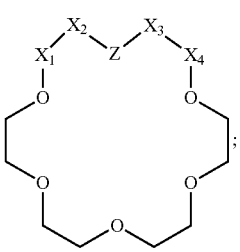
;
(Structure 6)

wherein the remainder of the variables are as described hereinabove.

In still other embodiments of the present invention, suitable pseudocrown ethers may have a structure of

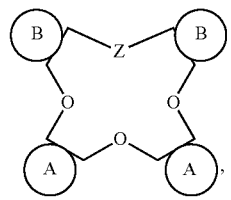
(Structure 7)

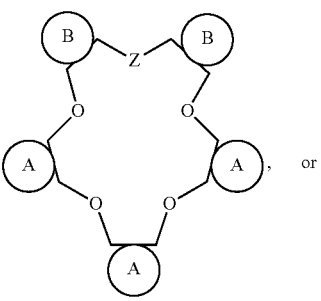
, or
(Structure 8)

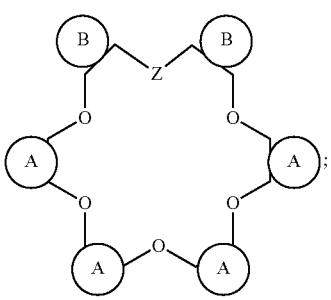
;
(Structure 9)

wherein B comprises a carbocyclic ring and A and Z are defined as above. In some embodiments of the present invention, B can comprise a cycloalkyl ring. In other embodiments of the present invention, B can comprise a phenyl ring or other type of aromatic ring.

As one of ordinary skill in the art will recognize, crown ethers having certain ring sizes are more particularly suited for complexing some alkali metal ions over others. For example, 12-crown-4 may preferentially complex lithium ions, 15-crown-5 may preferentially complex sodium ions, and 18-crown-6 may preferentially complex potassium ions. One of ordinary skill in the art will recognize that Structures 1, 4, and 7 have one less ring oxygen atom than does 12-crown-4. Likewise, Structures 2, 5, and 8 have one less ring oxygen atom than does 15-crown-5, and Structures 3, 6, and 9 have one less ring oxygen atom than does 18-crown-6. Thus, when n is 1, the ring size of Structures 1-9 will be analogous to that of the corresponding parent crown ether. Accordingly, it is anticipated that Structures 1, 4, and 7 will preferentially complex lithium ions when n is 1, Structures 2, 5, and 8 will preferentially complex sodium ions when n is 1, and Structures 3, 6, and 9 will preferentially complex potassium ions when n is 1. However, it is to be recognized that for n≠1, the selectivity for alkali metal ion complexation may be different than that of the parent crown ether. For example, when n is 2 or 3, Structures 2, 5, and 8 may have some affinity for potassium rather than sodium due to the larger ring size.

Various strategies are contemplated for closing the macrocyclic ring in the foregoing types of pseudocrown ethers. In some embodiments, the macrocyclic ring may be closed by forming the linkage $X_2$—Z—$X_3$. In some embodiments, formation of the linkage $X_2$—Z—$X_3$ may take place by a head-to-head or head-to-tail radical coupling of an allyl ether, an acrylate, or a vinyl ether to another allyl ether, acrylate, or vinyl ether. In some embodiments, ring closing olefin metathesis of an allyl ether, vinyl ether, or acrylate to another allyl ether, vinyl ether or acrylate may be used to form the linkage $X_2$—Z—$X_3$. In some embodiments, an allyl ether, a vinyl ether, or an acrylate may undergo radical polymerization, and a radical intermediate may undergo internal radical trapping with an allyl ether, a vinyl ether, or an acrylate in order to close the macrocyclic ring. That is, in such embodiments, the pseudocrown ether may be covalently bonded to a polymer. It is to be recognized that the foregoing ring closure strategies are intended to be illustrative in nature only, and any appropriate synthetic technique may be used to form the pseudocrown ethers described herein.

In some embodiments of the present invention, the treatment fluids described herein can comprise hydrofluoric acid, a hydrofluoric acid-generating compound, or any combination thereof. Use of hydrofluoric acid and/or a hydrofluoric acid-generating compound may be particularly advantageous when treating a siliceous subterranean formation or a subterranean formation containing a siliceous material. In some or other embodiments of the present invention, hydrofluoric acid, a hydrofluoric acid-generating compound, or any combination thereof may be present in a treatment fluid that is separate from a treatment fluid comprising the alkali metal complexing agent. Suitable hydrofluoric acid-generating compounds may include, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetonitrile complex, boron trifluoride acetic acid complex, boron trifluoride dimethyl ether complex, boron trifluoride diethyl ether complex, boron trifluoride dipropyl ether complex, boron trifluoride dibutyl ether complex, boron trifluoride t-butyl methyl ether complex, boron trifluoride phosphoric acid complex, boron trifluoride dihydrate, boron trifluoride methanol complex, boron trifluoride ethanol complex, boron trifluoride propanol complex, boron trifluoride isopropanol complex, boron trifluoride phenol complex, boron trifluoride propionic acid complex, boron trifluoride tetrahydrofuran complex, boron trifluoride piperidine complex, boron trifluoride ethylamine complex, boron trifluoride methylamine complex, boron trifluoride triethanolamine complex, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

When used, a hydrofluoric acid-generating compound can be present in the treatment fluids described herein in an amount ranging between about 0.1% to about 20% by weight of the treatment fluid. In other embodiments of the present invention, an amount of the hydrofluoric acid-generating compound can range between about 0.5% to about 10% by weight of the treatment fluid or between about 0.5% to about 8% by weight of the treatment fluid. Hydrofluoric acid, when present, may be used in similar concentration ranges.

In some embodiments of the present invention, another acid, an acid-generating compound, or any combination thereof can be present in the treatment fluids in addition to hydrofluoric acid and/or a hydrofluoric acid-generating compound. In some embodiments of the present invention, the additional acid can be a mineral acid such as, for example, hydrochloric acid, or an organic acid such as, for example, acetic acid or formic acid. Other acids that also may be suitable for use in the treatment fluids include, for example, chloroacetic acid, dichloroacetic acid, trichloroacetic acid, or methanesulfonic acid. Examples of suitable acid-generating compounds can include, for example, esters, aliphatic polyesters, orthoesters, poly(ortho esters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol. Among other things, the additional acid or acid-generating compound can maintain the pH of the treatment fluids described herein at a desired low level as the hydrofluoric acid or hydrofluoric acid-generating compound becomes spent. As described below, when a chelating agent is present, the additional acid or acid-generating compound may also help maintain the pH of the treatment fluids at a level where the chelating agent is more active for chelation to take place. In some embodiments of the present invention, a mineral acid or an organic acid may be used in treatment fluids that comprise an alkali metal complexing agent but not hydrofluoric acid and/or a hydrofluoric acid-generating compound.

In some embodiments of the present invention, a chelating agent, an alkali metal salt thereof, a non-alkali metal salt thereof, or any combination thereof may be included in the treatment fluids described herein. As described above, a chelating agent may be included in the treatment fluids, for example, when it is desirable to provide additional sequestration of metal ions (e.g., Group 2 metal ions or transition metal ions) in a subterranean formation. One of ordinary skill in the art will be able to choose an appropriate chelating agent and amount thereof to include in a treatment fluid intended for a particular application, given the benefit of the present disclosure.

In some embodiments of the present invention, the chelating agent may be biodegradable. Although use of a biodegradable chelating agent may be particularly advantageous in some embodiments of the present disclosure, there is no requirement to do so, and, in general, any suitable chelating agent may be used. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life.

In some embodiments of the present invention, suitable chelating agents may include common chelating agent compounds such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediamindi(o-hydroxyphenylacetic) acid (EDDHA), glucoheptonic acid, gluconic acid, citric acid, any salt thereof, any derivative thereof, and the like. It is to be noted that NTA may be considered to be a biodegradable compound, but it may have undesirable toxicity issues.

In some embodiments of the present invention, suitable chelating agents may include biodegradable chelating agents such as, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N, N-diacetic acid, aspartic acid-N-monoacetic acid, any salt thereof, any derivative thereof, or any combination thereof.

When present, the chelating agent or a salt thereof can comprise about 1% to about 50% by weight of the treatment fluids described herein. In some embodiments of the present invention, the chelating agent or a salt thereof can comprise about 3% to about 40% by weight of the treatment fluid.

When a chelating agent is present in the present treatment fluids, the acid dissociation constants of the chelating agent can dictate the pH range over which the treatment fluid can be most effectively used. GLDA, for instance, has a pK, value of about 2.6 for its most acidic carboxylic acid functionality. Below a pH value of about 2.6, dissolution of metal ions will be promoted primarily by the acidity of a treatment fluid containing GLDA, rather than by chelation, since the chelating agent will be in a fully protonated state. MGDA, in contrast, has a $pK_a$ value in the range of about 1.5 to 1.6 for its most acidic carboxylic acid group, and it will not become fully protonated until the pH is lowered to below this level. In this respect, MGDA can be particularly beneficial for use in acidic treatment fluids, since it can extend the acidity range by nearly a full pH unit over which the chelating agent is an active chelant. The lower pH of the treatment fluid can beneficially allow for a more vigorous acidizing operation to take place.

In some embodiments of the present invention, an alkali metal complexing agent can be used in combination with other silica scale control additives in the present treatment fluids. As used herein, the term "silica scale control additive" is any substance capable of suppressing silica scale build-up by increasing the solubility of dissolved silicon, inhibiting polymer chain propagation of dissolved silicon to produce precipitates, and/or decreasing the size and/or quantity of precipitates formed from dissolved silicon. Use of an alkali metal complexing agent in combination with a silica scale control additive may beneficially provide a greater level of dissolved silicon than is possible using a conventional silica scale control additive alone. In addition, use of an alkali metal complexing agent may allow a conventional silica scale control additive to be used in treatment fluids that contain at least some alkali metal ions and/or in a subterranean formation that contains alkali metal ions. In some embodiments of the present invention, suitable conventional silica scale control additives may include, for example, phosphonates, aminocarboxylic acids, polyaminocarboxylic acids, polyalkyleneimines (e.g., polyethyleneimine), polyvinylamines, polyallylamines, polyallyldimethylammonium chloride, polyaminoamide dendrimers, any derivative thereof, and any combination thereof. Illustrative commercially available silica scale control additives include, for example, ACUMER 5000 (Rohm and Hass), and CLA-STA® XP and CLA-STA® FS (Halliburton Energy Services).

In some embodiments of the present invention, an alkali metal complexing agent may be used in treatment fluids in combination with a silica scale control additive comprising an ortho-dihydroxybenzene compound (e.g., a catechol). Use of catechols, particularly tannic acid, for silica scale control is described in commonly owned U.S. patent application Ser. No. 12/967,868, filed on Dec. 14, 2010 and now available as U.S. Pat. No. 8,727,002, which is incorporated herein by reference in its entirety.

In some embodiments of the present invention, an alkali metal complexing agent may be used in treatment fluids in combination with a silicate complexing agent that comprises a functionalized pyridine compound. Use of functionalized pyridine compounds for suppressing precipitation of dissolved silicon is described in commonly owned U.S. patent application Ser. No. 13/444,883 entitled "Treatment Fluids Comprising a Silicate Complexing Agent and Methods for Use Thereof," filed concurrently herewith and now available as U.S. Pat. No. 9,004,168, which is incorporated herein by reference in its entirety.

Use of an alkali metal complexing agent in combination with a silica scale control additive or like agent may be particularly advantageous for controlling silica scale in a subterranean formation using treatment fluids, since it is believed that these two materials operate by different mechanisms in inhibiting the production of insoluble silicon materials. Without being bound by theory or mechanism, it is believed that silica scale control additives or like agents may interact directly with dissolved silicon to increase the solubility of dissolved silicon, inhibit polymer chain propagation of dissolved silicon to produce precipitates, and/or decrease the size and/or quantity of precipitates formed from dissolved silicon. One or more different mechanisms may be operative in a given silica scale control additive, and different silica scale control additives may exhibit different mechanisms. Alkali metal complexing agents, in contrast, may complex the alkali metal ions that can form particularly damaging silica scale. Thus, by addressing the problem of silica scale deposition from two different mechanistic directions, a beneficial reduction thereof may be realized.

In additional embodiments of the present invention, the treatment fluids described herein may optionally further comprise any number of additives that are commonly used in treatment fluids including, for example, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, and the like. Combinations of these additives can be used as well.

In various embodiments of the present invention, treatment fluids comprising an alkali metal complexing agent may be used in conjunction with treating a subterranean formation.

More specifically, in some embodiments of the present invention, the treatment fluids described herein may be used in conjunction with a stimulation operation conducted in a subterranean formation. In some embodiments of the present invention, the stimulation operation can comprise a fracturing operation. In some or other embodiments of the present invention, the stimulation operation can comprise an acidizing operation. In some embodiments of the present invention, such an acidizing operation may be conducted using a treatment fluid that comprises hydrofluoric acid, a hydrofluoric acid-generating compound, or any combination thereof, particularly in a subterranean formation containing silicates and/or aluminosilicates. The silicates and/or aluminosilicates may be naturally occurring within the subterranean formation or be introduced during the course of treating the subterranean formation.

In some embodiments of the present invention, methods described herein can comprise: providing a treatment fluid that comprises an alkali metal complexing agent comprising a cyclic polyether having between 3 and 6 ether oxygen atoms present therein; and hydrofluoric acid, a hydrofluoric acid-generating compound, or any combination thereof; and introducing the treatment fluid into a subterranean formation.

In some embodiments of the present invention, methods described herein can comprise: providing a treatment fluid that comprises an alkali metal complexing agent comprising a pseudocrown ether; forming a complex of the pseudocrown ether with an alkali metal ion; and introducing the treatment fluid into a subterranean formation. In some embodiments of the present invention, the treatment fluid can further comprise hydrofluoric acid, a hydrofluoric acid-generating compound, or any combination thereof.

In some embodiments of the present invention, the treatment fluid can be introduced into the subterranean formation before forming the complex. In such embodiments of the present invention, the pseudocrown ether can complex alkali metal ions located within the formation. In other embodiments of the present invention, the treatment fluid can be introduced in the subterranean formation after forming the complex. For example, in such embodiments, the pseudocrown ether may complex alkali metal ions present within the treatment fluid, possibly arising from a chelating agent or other additive, if present. In some embodiments of the present invention, formation of a complex between the alkali metal ion and the pseudocrown ether may take place both before and after the treatment fluid is introduced into the subterranean formation.

In some embodiments of the present invention, methods described herein can comprise: providing a treatment fluid having a pH ranging between about 0 and about 8 that comprises an alkali metal complexing agent comprising a pseudocrown ether; introducing the treatment fluid into a subterranean formation; and performing an acidizing operation in the subterranean formation. In some embodiments of the present invention, the treatment fluid can further comprise hydrofluoric acid, a hydrofluoric acid-generating compound, or any combination thereof.

In some embodiments of the present invention, performing an acidizing operation can comprise at least partially dissolving a portion of the subterranean formation. In some embodiments of the present invention, the subterranean formation can comprise a siliceous formation, such as, for example, a sandstone formation or a clay-containing formation. In some embodiments of the present invention, the subterranean formation can comprise a matrix that is substantially non-siliceous but contains a siliceous material therein (e.g., introduced proppant particulates or siliceous particulates within a carbonate formation matrix).

In some embodiments of the present invention, the use of an alkali metal complexing agent in a subterranean treatment operation may reduce or eliminate the formation of insoluble fluorosilicates or aluminosilicates during treatment, relative to a like treatment fluid lacking the alkali metal complexing agent. As used herein, the term "like treatment fluid" refers to a treatment fluid having a similar composition to another treatment fluid but lacking at least one component thereof. That is, treatment fluids described herein may reduce or eliminate the formation of insoluble fluorosilicates or aluminosilicates compared to a treatment fluid of similar composition that otherwise lacks the alkali metal complexing agent.

In some embodiments of the present invention, the treatment fluids described herein may be used in stimulating a subterranean formation. In some embodiments of the present invention, such stimulating may comprise an acidizing operation, particularly an acidizing operation conducted in a siliceous formation. In some or other embodiments of the present invention, the treatment fluids described herein may be used in other types of subterranean treatment operations. For example, in some embodiments of the present invention, the treatment fluids may be used during drilling or while remediating a subterranean formation.

When used in conjunction with a stimulation operation, particularly an acidizing operation, an acid (e.g., hydrofluoric acid, a hydrofluoric acid-generating compound, or any combination thereof) may be combined with an alkali metal complexing agent in a treatment fluid, in some embodiments of the present invention. That is, the alkali metal complexing agent and the hydrofluoric acid and/or hydrofluoric acid-generating compound can be introduced into the subterranean formation together in such embodiments. In such embodiments of the present invention, the treatment fluid may also be used to perform a combined stimulation operation such as, for example, a fracture-acidizing treatment, if the introduction pressure is sufficiently high. In some embodiments of the present invention, an additional mineral acid and/or organic acid can be included in addition to the hydrofluoric acid and/or hydrofluoric acid-generating compound, as described hereinabove.

In other embodiments of the present invention, the alkali metal complexing agent and the hydrofluoric acid and/or hydrofluoric acid-generating compound may be placed in separate treatment fluids. In such embodiments of the present invention, the treatment fluid comprising the alkali metal complexing agent may be introduced before, concurrently with, or after the treatment fluid comprising hydrofluoric acid and/or a hydrofluoric acid-generating compound. In some embodiments of the present invention, a treatment fluid comprising an alkali metal complexing agent may be introduced into a subterranean formation before a treatment fluid that comprises hydrofluoric acid, a hydrofluoric acid-generating compound, or any combination thereof. In such embodiments of the present invention, the subterranean formation can be left in a condition that disfavors precipitation of alkali metal fluorosilicates once acidizing begins by depleting the formation in free alkali metal ions. For example, a treatment fluid comprising an alkali metal complexing agent may be used in a hydraulic fracturing operation to create or extend at least one fracture in a subterranean formation. Depending on other operational considerations, other types of stimulation operations can be conducted prior to acidizing taking place, thereby leaving the formation in a condition that disfavors alkali metal fluorosilicate precipitation once acidizing begins. In some or other embodiments of the present invention, a treatment fluid comprising an alkali metal complexing agent may be introduced into a subterranean formation after a treatment fluid that comprises hydrofluoric acid, a hydrofluoric acid-generating compound, or any combination thereof. In some embodiments of the present invention, a treatment fluid comprising an alkali metal complexing agent and a treatment fluid that comprises hydrofluoric acid, a hydrofluoric acid-generating compound, or any combination thereof may be introduced concurrently into a subterranean formation. Optionally, any of these treatment operations can be followed by further treatment operations.

In some embodiments of the present invention, the present treatment fluids may be used in conjunction with an acidizing operation performed in a subterranean formation, particularly a subterranean formation that comprises a siliceous mineral or has had a siliceous material introduced thereto. In some embodiments of the present invention, the subterranean formation being treated by the acidizing operation can comprise a sandstone formation and/or a clay-containing formation. In some or other embodiments of the present invention, the subterranean formation can have had a silicate or an aluminosilicate (i.e., a siliceous material) introduced thereto. For example, in a fracturing operation, sand particulates (a silicate) or a ceramic propping material may be introduced to the subterranean formation. These introduced siliceous materials may be effectively treated according to the methods described herein as well.

In some embodiments of the present invention, acidizing operations or other stimulation operations conducted using the treatment fluids described herein may be performed in the absence of an $NH_4^+$ salt. As described above, use of an alkali metal complexing agent in treatment fluids that encounter fluorosilicates or aluminosilicates may allow at least some alkali metal ions to be present, either in the subterranean formation or in the treatment fluid. In some embodiments of the present invention, the treatment fluids described herein may be substantially free of $NH_4^+$ ions. In other embodiments of the present invention, the treatment fluids described herein may comprise an $NH_4^+$ salt or be used in conjunction with another treatment fluid that comprises an $NH_4^+$ salt. For example, one might choose to use a treatment fluid comprising an $NH_4^+$ salt in conjunction with a treatment fluid comprising an alkali metal complexing agent if the amount of alkali metal ions in the subterranean formation is high enough that the alkali metal complexing agent alone cannot effectively reduce or eliminate the formation of insoluble fluorosilicates or aluminosilicates when performing an acidizing operation.

In some embodiments of the present invention, the treatment fluids described herein may be used in treating a particulate pack in a subterranean formation. Particulate packs may include, for example, proppant packs and gravel packs. Treatment of a particulate pack with treatment fluids comprising an alkali metal complexing agent may beneficially allow the permeability of the pack to be increased, such that it presents a lower impediment to fluid flow.

In some or other embodiments of the present invention, the treatment fluids described herein may be used in remediation operations within a subterranean formation. Specifically, in some embodiments, treatment fluids described herein comprising an alkali metal complexing agent may be used to remove precipitation or accumulation damage within a subterranean formation. As used herein, the term "precipitation or accumulation damage" refers to a siliceous material that has been dissolved in a subterranean formation and deposited elsewhere within the subterranean formation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
providing a treatment fluid that comprises:
hydrofluoric acid, a hydrofluoric acid-generating compound, or any combination thereof; and
a pseudocrown ether having a structure selected from the group consisting of

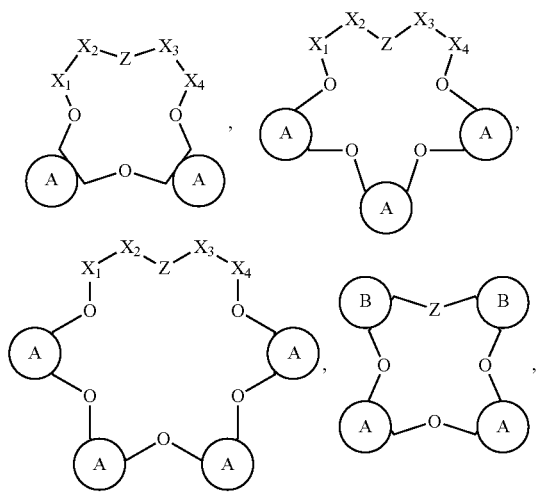

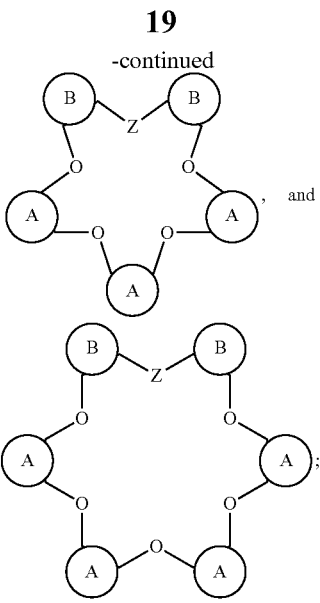

wherein, at each occurrence, A independently comprises a carbocyclic ring or —CH$_2$CH$_2$—;

wherein X$_1$ and X$_4$ are independently CH$_2$ or C=O;

wherein X$_2$ and X$_3$ are independently CH$_2$, CHR$_1$ or CR$_1$R$_2$;

wherein R$_1$ and R$_2$ are independently selected from the group consisting of alkyl, aryl, cycloalkyl, or a polymer;

wherein Z is (CH$_2$)$_n$;

wherein n is an integer ranging from 0 to 2;

wherein X$_2$ and X$_3$ are bonded to one another if n is 0; and wherein B is a carbocyclic ring; and introducing the treatment fluid into a subterranean formation in the presence of alkali metal ions.

2. The method of claim 1, further comprising:

forming a complex of the pseudocrown ether with an alkali metal ion.

3. The method of claim 1, wherein the treatment fluid further comprises a chelating agent, an alkali metal salt of a chelating agent, a non-alkali metal salt of a chelating agent, or any combination thereof.

4. The method of claim 1 wherein the pseudocrown ether is covalently bonded to a polymer.

5. The method of claim 1, wherein each A is —CH$_2$CH$_2$—.

6. A method comprising:

providing a treatment fluid that comprises:

a pseudocrown ether having a structure selected from the group consisting of

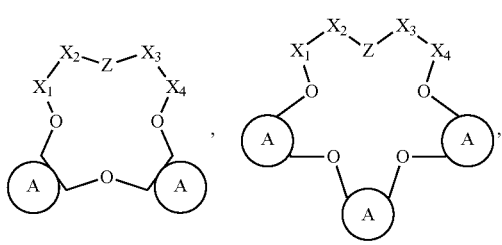

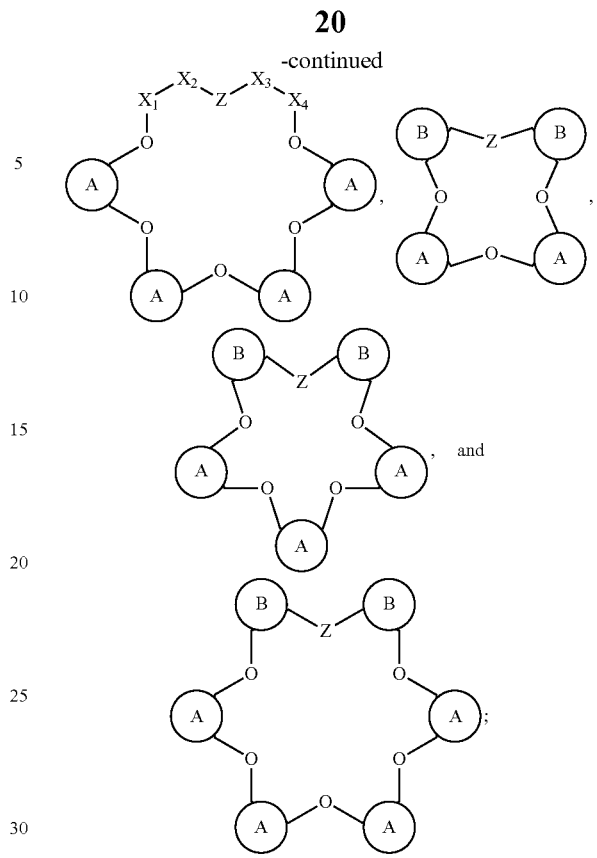

wherein, at each occurrence, A independently comprises a carbocyclic ring or —CH$_2$CH$_2$—;

wherein X$_1$ and X$_4$ are independently CH$_2$ or C=O;

wherein X$_2$ and X$_3$ are independently CH$_2$, CHR$_1$ or CR$_1$R$_2$;

wherein R$_1$ and R$_2$ are independently selected from the group consisting of alkyl, aryl, cycloalkyl, or a polymer;

wherein Z is (CH$_2$)$_n$;

wherein n is an integer ranging from 0 to 2;

wherein X$_2$ and X$_3$ are bonded to one another if n is 0; and wherein B is a carbocyclic ring;

forming a complex of the pseudocrown ether with an alkali metal ion; and introducing the treatment fluid into a subterranean formation.

7. The method of claim 6, wherein the treatment fluid is introduced into the subterranean formation before forming the complex.

8. The method of claim 6, wherein the pseudocrown ether is covalently bonded to a polymer.

9. The method of claim 6, wherein the treatment fluid further comprises hydrofluoric acid, a hydrofluoric acid-generating compound, or any combination thereof.

10. The method of claim 6, wherein the treatment fluid is introduced into the subterranean formation before or after a treatment fluid that comprises hydrofluoric acid, a hydrofluoric acid-generating compound, or any combination thereof.

11. The method of claim 6, wherein each A is —CH$_2$CH$_2$—.

12. The method of claim 6, wherein the treatment fluid further comprises a carrier fluid comprising alkali metal ions.

13. The method of claim 6, wherein the treatment fluid further comprises a chelating agent, an alkali metal salt of a chelating agent, a non-alkali metal salt of a chelating agent, or any combination thereof.

14. The method of claim 6, further comprising:
performing a stimulation operation in the subterranean formation, treating a particulate pack in the subterranean formation, remediating precipitation or accumulation damage within the subterranean formation, or any combination thereof.

15. A method comprising:
providing a treatment fluid having a pH ranging between about 0 and about 8 that comprises:
a pseudocrown ether having a structure selected from the group consisting of

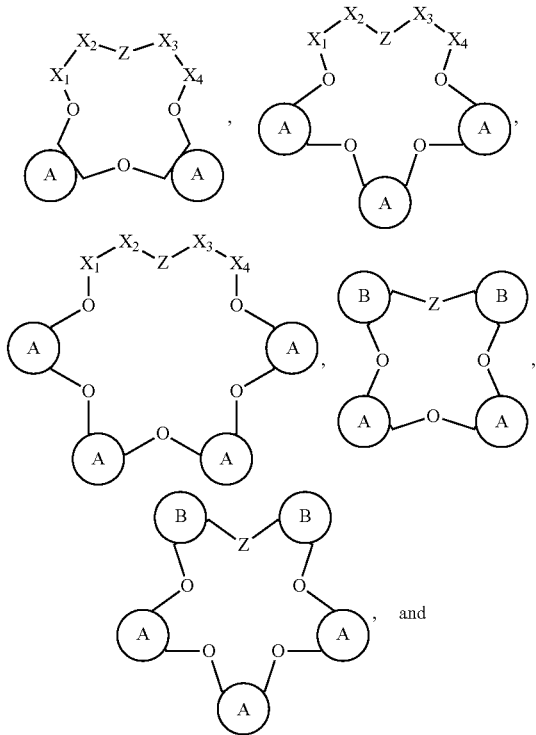

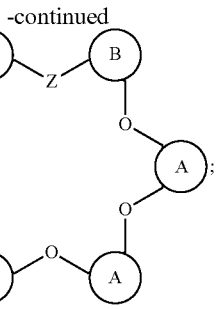

wherein, at each occurrence, A independently comprises a carbocyclic ring or —$CH_2CH_2$—;
wherein $X_1$ and $X_4$ are independently $CH_2$ or C=O;
wherein $X_2$ and $X_3$ are independently $CH_2$, $CHR_1$, or $CR_1R_2$;
wherein $R_1$ and $R_2$ are independently selected from the group consisting of alkyl, aryl, cycloalkyl, or a polymer;
wherein Z is $(CH_2)_n$;
wherein n is an integer ranging from 0 to 2;
wherein $X_2$ and $X_3$ are bonded to one another if n is 0; and
wherein B is a carbocyclic ring;
introducing the treatment fluid into a subterranean formation; and
performing an acidizing operation in the subterranean formation.

16. The method of claim 15, wherein the acidizing operation is performed in the absence of an $NH_4^+$ salt.

17. The method of claim 15, wherein the treatment fluid further comprises hydrofluoric acid, a hydrofluoric acid-generating compound, or any combination thereof.

18. The method of claim 15, wherein the treatment fluid is introduced into the subterranean formation before or after a treatment fluid that comprises hydrofluoric acid, a hydrofluoric acid-generating compound, or any combination thereof.

19. The method of claim 15, wherein the treatment fluid further comprises a chelating agent, an alkali metal salt of a chelating agent, a non-alkali metal salt of a chelating agent, or any combination thereof.

20. The method of claim 15, wherein the pseudocrown ether is covalently bonded to a polymer.

21. The method of claim 15, wherein each A is —$CH_2CH_2$—.

* * * * *